United States Patent Office 3,786,031
Patented Jan. 15, 1974

3,786,031
POLYAMIDEURETHANES AND THEIR PREPARATION
Shitomi Katayama, Hideichi Horikawa, Masao Obuchi, and Yoshihiro Ito, Akita, Japan, assignors to Denki Onkyo Co., Ltd., Tokyo, Japan
No Drawing. Continuation-in-part of application Ser. No. 216,278, Jan. 7, 1972, which is a continuation-in-part of application Ser. No. 127,374, Mar. 23, 1971, both now abandoned. This application Dec. 11, 1972, Ser. No. 313,675
Claims priority, application Japan, Mar. 27, 1970, 45/25,757
Int. Cl. C08g 22/04
U.S. Cl. 260—77.5 AQ    29 Claims

ABSTRACT OF THE DISCLOSURE

Polyamideurethanes, having the combined desirable physical properties of polyamides and polyurethanes, are provided by a polyaddition reaction of an amidediol or a diamidediol with a diisocyanate. The products include both linear and cross-linked polymers characterized by a wide range of inherent viscosity. The substantially linear polymers of the invention are useful as synthetic textile fibers or as filaments. The cross-linked polymers are good construction materials.

CROSS-REFERENCE TO RELATED APPLICATIONS

This application is a continuation-in-part of our copending application Ser. No. 216,278, filed Jan. 7, 1972, which in turn is a continuation-in-part of my copending application, Ser. No. 127,374, filed Mar. 23, 1971, both of which are now abandoned.

BACKGROUND OF THE INVENTION

Generally, polyamides and polyurethanes differ with respect to many physical and chemical properties. Polyamides, such as nylon, are comparatively stable to weak alkali, but are unstable to strong alkali and weak acids. Polyurethanes, on the other hand, are typified by stability against alkali and acids. When polyamides and polyurethanes are compared, polyurethanes are superior in solvent resistance, age resistance and stability against oxygen. Polyamides show an advantage in hygroscopicity and in spinning, dyeing and crystallizing properties. The melting point of polyamides are higher than those of polyurethanes.

Because polyamides and polyurethanes have desirable properties which complement each other, many processes, such as mixed spinning, blending and the like, have been devised to combine these properties in a single product. However, such processes have heretofore rarely been made practical, largely because the big differences in the properties of the polymers tend to make them incompatible in simple physical admixtures.

An object of this invention is to produce a new kind of polymer possessing the desirable properties of both polyamides and polyurethanes by a polyaddition reaction of an amidediol or a diamidediol with a diisocyanate.

SUMMARY OF THE INVENTION

In accordance with the present invention there is provided a polymer comprising a plurality of repeating units of the formula:

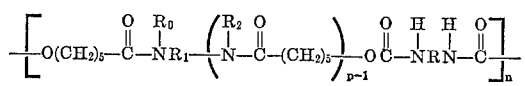

wherein:

(a) $p$ is an integer having a value of 1 or 2;
(b) R is a bivalent saturated aliphatic radical having from 2–20 carbon atoms, a bivalent aromatic radical having from 6–18 carbon atoms or a bivalent radical of at least one saturated aliphatic radical and at least one aromatic radical, the total aliphatic and aromatic portions of the bivalent radical R having from 1–20 and from 6–18 carbon atoms, respectively;
(c) when $p$ is 1, (i) $R_0$ is hydrogen, a monovalent saturated aliphatic radical, a monovalent aromatic radical or a monovalent radical of at least one saturated aliphatic radical and at least one aromatic radical, the total aliphatic and aromatic portions of $R_0$ having from 1–20 and from 6–18 carbon atoms, respectively, and $R_1$ is a bivalent saturated aliphatic radical or a bivalent radical of at least one saturated aliphatic radical connected to the adjacent oxygen radical and at least one aromatic radical, the total aliphatic and aromatic portions of $R_1$ having from 1–20 and from 6–18 carbon atoms, respectively, or,
(ii) optionally, $R_0$ and $R_1$ together form $R_3$ which taken taken with the intermediate nitrogen radical forms a heterocycloalkane radical, $R_3$ being a trivalent saturated aliphatic radical or a trivalent radical of at least one saturated aliphatic radical and at least one aromatic radical, the total aliphatic and aromatic portions of $R_3$ having from 4–20 and 6–18 carbon atoms, respectively, (d) when $p$ is 2, (i) $R_0$ and $R_2$ are hydrogen, monovalent saturated aliphatic radicals, monovalent aromatic radicals or monovalent radicals of at least one saturated aliphatic radical and at least one aromatic radical, the total aliphatic and aromatic portions of $R_0$ and $R_2$ having from 1–20 and from 6–18 carbon atoms, respectively, and $R_1$ is a bivalent saturated aliphatic radical having from 2–20 carbon atoms, a bivalent aromatic radical having from 6–18 carbon atoms, or a bivalent radical of at least one saturated aliphatic radical and at least one aromatic radical, the total aliphatic and aromatic portions of bivalent radical $R_1$ having from 1–20 and from 6–18 carbon atoms, respectively, or
(ii) optionally, $R_0$ and $R_1$ together form $R_3$ which taken with the intermediate nitrogen radical forms a heterocycloalkane ring structure, $R_3$ being a trivalent saturated aliphatic radical or a trivalent radical of at least one saturated aliphatic radical and at least one aromatic radical, the total aliphatic and aromatic portions of $R_3$ having from 4 to 20 and 6–18 carbon atoms, respectively, and $R_2$ is hydrogen, a monovalent saturated aliphatic radical, a monovalent aromatic radical or a monovalent radical of at least one saturated aliphatic radical and at least one aromatic radical, the total aliphatic and aromatic portions of $R_2$ having from 1–20 and from 6–18 carbon atoms, respectively, or,
(iii) optionally, $R_0$ and $R_2$ together form $R_4$, $R_1$ and $R_4$ being bivalent saturated aliphatic radicals or bivalent radicals of at least one saturated aliphatic radical and at least one aromatic radical which form with adjacent nitrogen radicals a heterocycloalkane ring structure, the aliphatic and aromatic portions of $R_1$ and $R_4$ each having from 1–20 and from 6–18 carbon atoms, respectively, and (e) $n$ is a value such that the inherent viscosity is at least 0.1 when measured in m-cresol at 30° C. at a concentration of 0.5 g. per 100 ml. of m-cresol and increases to infinity in the case of cross-linked polymers.

According to a preferred embodiment of the invention, (a) $p$ is an integer having a value of 1 or 2;
(b) R is an alkylene radical having from 2–20 carbon atoms, a cycloalkylene, an arylene or an aralkylene, the total aliphatic and aromatic portions of R having from 1–20 and from 6–18 carbon atoms, respectively;
(c) when $p$ is 1, (i) $R_0$ is hydrogen, an alkyl radical, a cycloalkyl radical, an aryl radical or an aralkyl radical, the total aliphatic and aromatic portions of $R_0$ having from 1–20 and from 6–18 carbon atoms, respectively, and $R_1$ is an alkylene radical, a cycloalkylene radical, or an aralkylene radical having the aliphatic portion connected to the adjacent oxygen radical, the total aliphatic and aromatic portions of $R_1$ having from 1–20 and from 6–18 carbon atoms, respectively, or,
(ii) optionally, $R_0$ and $R_1$ together form $R_3$ which taken with the intermediate nitrogen radical forms a 5 or 6 membered heterocycloalkane radical, $R_3$ being a trivalent radical of alkane, cycloalkylalkane, or arylalkane, the total aliphatic and aromatic portions of $R_3$ having from 4 to 20 and 6–18 carbon atoms, respectively, (d) when $p$ is 2, (i) $R_0$ and $R_2$ are hydrogen, alkyl radicals, cycloalkyl radicals, aryl radicals or aralkyl radicals, the total aliphatic and aromatic portions of $R_0$ and $R_2$ having from 1–20 and from 6–18 carbon atoms, respectively, and $R_1$ is an alkylene radical having from 2–20 carbon atoms, cycloalkylene radical, an arylene radical or an aralkylene radical, the total aliphatic and aromatic portions of $R_1$ having from 1–20 and from 6–18 carbon atoms, respectively,
(ii) optionally, $R_0$ and $R_1$ together form $R_3$ which taken with the intermediate nitrogen radical forms a 5 or 6 membered heterocycloalkane ring structure, $R_3$ being a trivalent radical of alkane, cycloalkylalkane or aralkane, the total aliphatic and aromatic portions of $R_3$ having from 4 to 20 and 6–18 carbon atoms, respectively, and $R_2$ is hydrogen, an alkyl radical, a cycloalkyl radical, an aryl radical or an aralkyl radical, the total aliphatic and aromatic portions of $R_2$ having from 1–20 and from 6–18 carbon atoms, respectively, or,
(iii) optionally, $R_0$ and $R_2$ together form $R_4$, $R_1$ and $R_4$ being alkylene radicals, cycloalkyalkylene radicals or aralkylene radicals which form with adjacent nitrogen radicals a 5 or 6 membered ring structure, the aliphatic and aromatic portions of $R_1$ and $R_4$ each having from 1–20 and from 6–18 carbon atoms, respectively, and (e) $n$ is a value such that the inherent viscosity is at least 0.1 when measured in m-cresol at 30° C. at a concentration of 0.5 g. per 100 ml. of m-cresol and increases to infinity in the case of cross-linked polymers.

In one preferred embodiment, said inherent viscosity has a value of 0.4–5. In another preferred embodiment, said inherent viscosity is infinite and said polymer is highly cross-linked.

In various preferred embodiments, $R_0$ and $R_2$ are hydrogen, $R_1$ is ethylene, R is hexamethylene and $p$ is 1; $R_0$ and $R_2$ are hydrogen, $R_1$ is ethylene, R is diphenylmethane and $p$ is 1; $R_0$ and $R_2$ are hydrogen, $R_1$ is ethylene, R is hexamethylene and $p$ is 2; $R_0$ and $R_2$ are hydrogen, $R_1$ is ethylene, R is diphenylmethane and $p$ is 2; $R_0$ and $R_2$ are hydrogen, $R_1$ is hexamethylene, R is hexamethylene and $p$ is 2; $R_0$ and $R_2$ are hydrogen, $R_1$ is hexamethylene, R is toluylene and $p$ is 2; and $R_0$, $R_1$ and $R_2$ taken with adjacent nitrogen radicals form piperazine, R is hexamethylene, diphenylmethane or toluylene and $p$ is 2.

The present invention further provides for a method for making a polymer having repeating units of the formula:

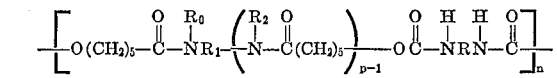

said method comprising: forming a diol-diisocyanate admixture of compounds comprising a diol of the formula:

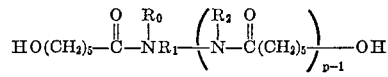

and a diisocyanate of the formula $$O=C=N-R-N=C=O$$

wherein $R_0$, $R_1$, $R_2$, R and $p$ are as defined above, at least a stoichiometric quantity of diisocyanate being present in the admixture based on the diol content thereof; allowing said admixture to react under substantially anhydrous conditions at a temperature of 50–250° C.; and recovering the polymeric product from the reaction mixture.

In preferred embodiments, the diol portion of the admixture includes up to 90% by weight of an alkylene diol, a cycloalkylene diol or an aralkylene diol in which the aliphatic portion has from 2–20 carbon atoms. The diol of the formula is N-6-hydroxycaproyl aminoalcohol, N,N'-di-(6-hydroxycaproyl) diamine or an admixture thereof. According to one aspect of the invention, the reaction is conducted in the presence of an inert organic solvent. The solvent is preferably a member selected from the group consisting of amides, ketones, cyclic thioethers and chlorobenzenes. In one embodiment the diisocyanate is preferably added portionwise to the diol.

In accordance with one preferred embodiment, the diisocyanate is present in an amount of up to a 30% molar excess, based on the stoichiometric amount of diol, preferably between 10% and 30%. Another embodiment provides for the diisocyanate in an amount up to a 10% molar excess based on the stoichiometric amount of diol. Most suitably, the reaction is conducted in the presence of a catalytic amount of a catalyst selected from the group consisting of organo tin compounds and tertiary amines. In one preferred embodiment, the reaction temperature is 100–200° C.

Another aspect of the invention relates to a polyamideurethane prepared by reacting N,N'-di-(6-hydroxycaproyl) diamine or N-6-hydroxycaproyl aminoalcohol with an organic diisocyanate wherein (a) N,N'-di-(6-hydroxycaproyl) diamine is an alkylene, a cycloalkylene, an arylene, an aralkylene, or a heterocyclic diamine, each of the two amino groups of said diamine being either primary or secondary; (b) said organic diisocyanate is an alkylene, a cycloalkylene, an arylene or an aralkylene diisocyanate; (c) N-6-hydroxycaproyl aminoalcohol is an alkylene, cycloalkylene, aralkylene or a heterocyclic monoamino monoalcohol; and (d) the degree of polymerization of said polyamideurethane is such that the inherent viscosity is at least 0.1 when measured in m-cresol at 30° C. at a concentration of 0.5 g. per 100 ml. of m-cresol and increases to infinity in the case of cross-linked polymers.

Another preferred embodiment provides for a polymer having a plurality of repeating units of the formula:

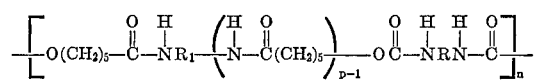

wherein:

(a) $R_1$ is an alkylene radical having from 2–20 carbon atoms;
(b) R is a member selected from the group consisting of alkylene radicals having from 2–20 carbon atoms, diphenylalkylene radicals and lower alkyl substituted diphenylalkylene radicals, the alkyl and alkylene portions of which have from 1–20 carbon atoms and arylene radicals having from 6–18 carbon atoms;

(c) $p$ is an integer having a value of 1–2; and (d) $n$ is a value such that the inherent viscosity is at least 0.4 when measured in m-cresol at 30° C. at a concentration of 0.5 g./100 ml. m-cresol.

DETAILED DESCRIPTION

The polymers of the present invention, polyamideurethanes (abbreviated as PAD below), polydiamideurethanes (abbreviated as PDAD below) or the copolymers containing these polymer units, have a plurality of repeating units of the formula:

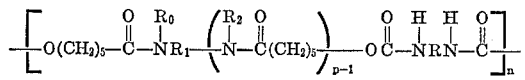

wherein $p$ is an integer having a value of 1–2; and $n$ is a value such that the inherent viscosity is at least 0.1 when measured at a concentration of 0.5 g./100 ml. m-cresol at 30° C. and increases to infinity in the case of cross-linked polymers.

The above formula not only generically describes the invention but best represents a preferred embodiment in which $R_0$, $R_1$ and/or $R_2$ do not form heterocyclic compounds when taken with the adjacent nitrogen radicals. In the non-heterocyclic situation, R and $R_1$ are bivalent saturated aliphatic radicals such as alkylenes (except methylene) and cycloalkylenes, bivalent aromatic radicals, such as arylenes, and combinations thereof such as arylalkylenes. The total aliphatic and aromatic portions of R and $R_1$ have from 1–20 and from 6–18 carbon atoms, respectively. When $p$ is 1, $R_1$ must include an aliphatic radical which connects directly to the adjacent oxygen radical. In other words, in this case, $R_1$ cannot be an arylene radical.

Suitable alkylene (including cycloalkylene) radicals include acylic groups, such as ethylene, trimethylene, tetramethylene, isobutylene, pentamethylene, hexamethylene, heptamethylene, octamethylene, nonamethylene, decamethylene, 2 - methyloctamethylene, and cyclic groups, such as cyclopropylene, 1,2-cyclobutylene, 1,3-cyclobutylene, 1,2-cyclopentylene, 1,3-cyclohexylene, 1,4-cyclohexylene, methylene cyclohexane, 1,2-dimethylenecyclohexane, 1,3-dimethylenecyclohexane, 1,4-dimethylenecyclohexane, 4,4′-methylenedicyclohexylene, 1,2-cyclopentylene and 1,3-cyclopentylene. Suitable aralkylene radicals are, for example, diphenylalkylenes such as diphenylmethane, diphenylethane; lower alkyl substituted diphenylalkylenes; toluylene; o-oxylylene; m-xylylene, p-xylylene, 1,4-diethylenebenzene, etc. Suitable arylene radicals include o-phenylene, m-phenylene, p-phenylene, bisphenylenes, naphthylenes, anthracenes, phenanthrenes.

Also, the non-heterocyclic situation, $R_0$ and $R_2$ are hydrogen, monovalent aliphatic radicals, such as alkyls and cycloalkyls, monovalent aromatic radicals such as aryls, and combinations thereof such as aralkyls. The total aliphatic and aromatic portions of $R_0$ and $R_2$ have from 1–20 and from 6–18 carbon atoms, respectively. Preferably, $R_0$ and $R_2$ are hydrogen or lower alkyl radicals, e.g., methyl or ethyl.

Suitable alkyls include, for example, methyl, ethyl, propyl, n-butyl, n-pentyl, n-hexyl, n-heptyl, n-octyl, n-nonyl, n-decyl and variations thereof like iso-butyl, iso-pentyl, neopentyl, etc. The examples of cycloalkyl include cyclopropyl, cyclobutyl, cyclopentyl and cyclohexyl. Suitable aryl radicals include phenyl, bisphenyl and the like. Examples of aralkyls are toly, xylyl, etc.

In the embodiments of the present invention wherein at least two of $R_0$, $R_1$ and $R_2$ combine to form heterocyclic radicals when taken with adjacent nitrogen radicals, two configurations are possible. $R_0$ and $R_1$ can together form $R_3$, a trivalent radical or $R_0$ and $R_2$ can together form $R_4$, a bivalent radical. Preferably, both radicals, when taken with adjacent nitrogen radicals form 5 or 6 membered heterocycloalkane radicals.

Using as a specific example, the situation wherein $p$ is 2 and $R_0$ and $R_1$ together form $R_3$, the polymer of the present invention is best represented by the following formula:

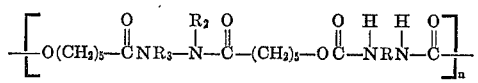

$R_3$ is a trivalent saturated aliphatic radical such as a trivalent alkane or cycloalkylalkane or a trivalent radical of at least one saturated aliphatic radical and at least one aromatic radical, such as a trivalent aralkane radical. Preferably, the total aliphatic and aromatic portions of $R_3$ have from 4–20 and from 6–18 carbon atoms, respectively. Preferred trivalent alkane radicals include those of N-butyline(tetramethine), N-pentine, iso-pentine, and the like. The preferred trivalent alkane radical forms a 5 or 6 membered heterocycloalkane ring with one of the nitrogen radicals, the ring being bonded directly or indirectly through an alkylene group such as those previously listed to the other nitrogen radical. In the cycloalkylalkane situation, the 5 or 6 membered heterocycloalkane ring is also formed, but additionally including a cycloalkane radical which may be bonded directly or indirectly between the heterocycloalkane radical and the nitrogen radical or the former alone.

Again, using the specific situation wherein $p$ is 2, when $R_0$ and $R_2$ together form $R_4$, the polymer of the present invention assumes the following structure:

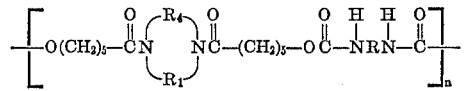

In this embodiment, $R_1$ and $R_4$ are bivalent saturated aliphatic radicals, such as alkylene or cycloalkylalkylene radicals, or bivalent radicals of at least one saturated aliphatic radical and at least one aromatic radical, such as aralkylene radicals. Both $R_1$ and $R_4$ together with adjacent nitrogen radicals form a heterocycloalkane ring structure, preferably a 5 or 6 membered ring. The aliphatic and aromatic portions of $R_1$ and $R_4$ each have from 1–20 and from 6–18 carbon atoms, respectively.

Suitable alkylene radicals for $R_1$ and $R_4$ include methylene, ethylene, iso-butylene, etc. Most preferably, $R_1$ and $R_4$ are selected to form 1,4-piperazine or 1,3-piperazine. Preferred cycloalkylalkylenes and aralkylenes are cycloalkyl and aryl substituted alkylenes of the preferred types already indicated.

Although the situation where $p$ is 2 (polydiamideurethanes) has been described and illustrated, it is to be understood that the same description and corresponding illustrations are equally applicable where $p$ is 1, i.e., the polymer of the present invention is a polyamideurethane.

The polymers of the invention, polyamideurethanes (abbreviated as PAD below), polydiamideurethanes (abbreviated as PDAD below) or copolymers containing these polymer units are made by the polyaddition reaction of at least one aliphatic or aromatic diisocyanate (abbreviated as DI below) with N - 6 - hydroxycaproyl aminoalcohol (abbreviated to AD below) and/or N,N′-di-(6-hydroxycaproyl-diamine (abbreviated as DAD below). The process of this invention is illustrated by the following equations:

(1)   $HO(CH_2)_5\overset{O}{\overset{\|}{C}}-\overset{R_0}{\overset{|}{N}}R_1OH + O=C=N-R-N=C=O \longrightarrow$
   (AD)                                    (DI)

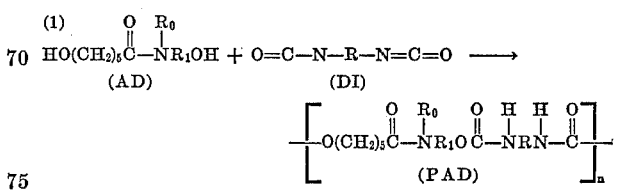

which contains at least one of the following connecting units:

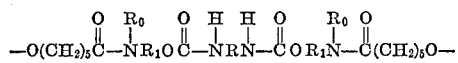
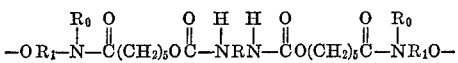
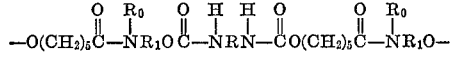

(2)
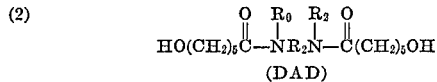
(DAD)

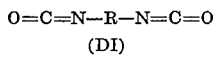
(DI)

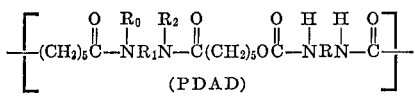
(PDAD)

In the above equations, $R_0$, $R_1$, $R_2$, R and n having meanings given above.

The basic starting materials of the invention, the indicated N-6-hydroxycaproyl aminoalcohols or N,N'-di-(6-hydroxycaproyl)-diamines and diisocyanates, are defined in terms of $R_0$, $R_1$, $R_2$ and R and combinations which yield $R_3$ and $R_4$. Both the aminoalcohols and diamines can be suitably prepared by reacting the corresponding aminoalcohols and diamines with ε-caprolactone. Using, for exemplary purposes only, the case of p is 2, the following equation illustrates the formation of N,N'-di-(6-hydroxycaproyl) diamines:

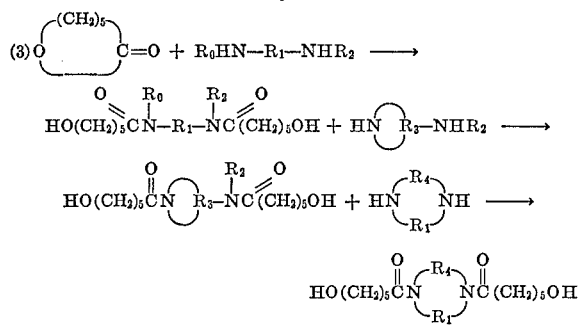

Examples of formulas of the above basic diamine reactants include, among others:

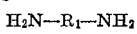
(a)

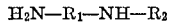
(b)

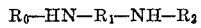
(c)

 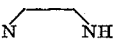 
(d)  (e)  (f)

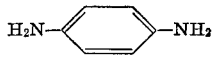 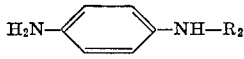
(g)  (h)

(i)

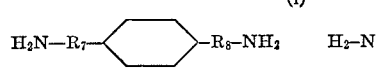 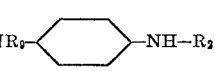
(j)  (k)

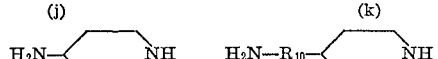 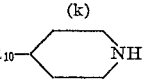
(l)  (m)

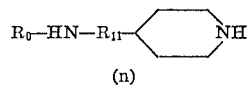
(n)

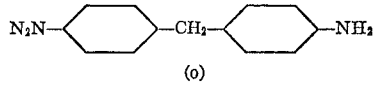
(o)

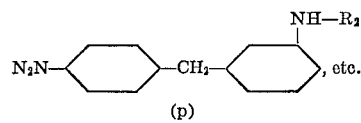
(p)

$R_5$–$R_{11}$ are alkylene, cycloalkylene, arylene, arylalkylene or other bivalent radicals within the context of the invention as defined previously.

The most preferred starting amino alcohols and diamines are alkyl or alkylene substituted including, for example, ethyl or ethylene, propyl or propylene, trimethylene, tetramethylene, pentamethylene, hexamethylene, heptamethylene, octamethylene, nonamethylene and the like. The most preferred diisocyanates include, for example, tetramethylene diisocyanate, pentamethylene diisocyanate, hexamethylene diisocyanate, phenylene diisocyanate, diphenylmethane diisocyanate, toluylene diisocyanate and the like.

The basic reactions of the invention have been shown above in Equations 1 and 2. The polymers of the invention include those made from the reaction of a single amidediol or diamidediol with a diisocyanate, and those copolymers wherein two or more amidediols or diamidediols are reacted with one or more diisocyanates or those in which two or more diisocyanates are reacted with one amidediol or diamidediol. Useful copolymers are also made by adding other diol compounds, such as alkylene diols having from two to twenty carbon atoms, to the amidediol or diamidediol prior to reaction with the diisocyanate. For example useful polymers can be made by adding up to 90%, based on the weight of total diol present, of an alkylene diol, a cycloalkylene diol or an aralkylene, diol, e.g., ethylene glycol, propylene glycol, 1,4-butanediol, 1,6-hexanediol and the like.

In making the polymers and copolymers of the invention, certain reaction conditions are particularly important, because of the amide linkage present in the starting amidediol or diamidediol. Depending upon the conditions either linear or crosslinked polymers can be obtained. The below preferred conditions for linear polymers are those which generally produce an inherent viscosity of 0.4 to 5 when measured at a concentration of 0.5 g./100 ml. m-cresol at 30° C.

The polymerization temperature must be greater than 50° C. and less than 250° C. At temperatures over 250° C., gelation resulting from side reactions and decomposition of the polymer may be observed and at a temperature below 50° C., the polymerization rate is reduced and the degree of polymerization is low; thus the process is not economical. For linear polymers the most favorable results are obtained at a polymerization temperature between 100 to 200° C. At temperatures approaching 250° C. crosslinked polymers usually result.

The polymerization time is usually 0.5 to 2 hours for polymerization at about 0.01 mole concentration level. However, the optimum time varies with the reaction volume.

With respect to the molar ratio of the starting diols and diisocyanates, at least stoichiometric quantities should be present. It is desirable to add a slight stoichiometric excess of diisocyanate, so that polymers having a high degree of polymerization can easily be obtained. In a small scale polymerization in which the starting diol compounds are used at a 0.01 molar concentration level, generally the addition of 10 to 30% excess of diisocyanate gives good results for linear polymers. In large scale polymerization, addition of up to 10% molar excess is sufficient. Up to a 10% molar excess usually results in cross-linked polymers. Over a 30% excess generally produces less desirable cross-linked polymers.

A solvent is not required for the polymerization, but the use of the solvent is desirable if linear polymers are the desired product. In the absence of a solvent, crosslinking and gel formation may occur. The choice of solvent can vary widely, but it must be organic solvent that is inert to the products and reactants. Useful solvents include amides, such as N,N-dimethylformamide, and N,N-dimethyl-acetamide; ketones; such as N-methyl pyrrolidone and methylpentanone; cyclic thioethers, such as dimethyl sulfoxide; chlorobenzenes, such as monochlorobenzene, dichlorobenzene and trichlorobenzene, and mixtures of the foregoing solvents. Commercially available solvents can be used directly, but solvents refined by dehydration with diisocyanate and distillation are desirable for obtaining polymers having a high dgree of polymerization.

From the above, it is apparent that to obtain good high-molecular weight linear polymers the following conditions are preferred:

(1) a polymerization temperature between 100 and 200° C.;

(2) a 10 to 30% stoichiometric excess of diisocyanate relative to diol; and (3) polymerization in the presence of a solvent.

The polymerization can be carried out without a catalyst. However, the addition of a small amount of up to 2% by weight, based on the weight of the reaction mixture, of an organo-tin or a tertiary amine catalyst, which are conventionally used for polyurethane manufacture, is effective in obtaining polymers having a high degree of polymerization. Specific useful catalysts include di-n-butyl-tin-di-laurylate, di-n-butyl-tin-di-acetate, di-n-butyl-tin-di-chloride, di-n-butyl-tin-sulfide, tri-n-butyl-tin-acetate, triethylamine, tri-n-butylamine and the like.

Because the elimination of moisture and carbon dioxide from this reaction system is quite necessary, the polymerization must be carried out under anhydrous conditions, preferably under an atmosphere of a dried inert gas, such as nitrogen, argon and the like.

To mix the diol and diisocyanate, the diisocyanate should be added carefully preferably portionwise, to the diol to prevent gelation by cross-linking and other side reactions, thus providing a polymer with a high degree of polymerization.

Depending on the method of their preparation, the polymers of the invention vary from linear polymers to highly cross-linked polymers. They are characterized by an inherent viscosity of at least 0.1, generally in the range of 0.4 to 5, for linear polymers as determined in m-cresol formamide at 30° C. In the case of cross-linked polymers, the inherent viscosity increases to infinity.

The polymers of the invention, when compared with the conventional polyurethanes produced from a diol having methylene groups in a number corresponding to the number of carbon atoms constituting the main chain of the amidediol or diamidediol, show a higher melting point, better crystallinity and much improved dyeability. The solvent resistance of the polymers of the invention against benzene, alcohols, ethers, etc. is better than that of conventional products. The new polymers are better than polyurethanes in melting and spinning properties. Stability of the polymers of the invention against light and oxygen is better than that of polyamides. In comparison with polyamides and polyurethanes, the new polymers are superior in blending properties.

These polymers can be cross-linked after casting or spinning giving an exceedingly tough product. As aryl groups are introduced into the polymer chain, the polymer becomes increasingly amorphous and is useful as a casting resin.

Substantially linear polyamideurethanes produced by the process of this invention are outstanding as synthetic textile materials, because the aliphatic polyamideurethanes, as well as aromatic ones, of this invention show high melting points and good crystallinity. The linear polymers in general are useful as textile fibers because of their high crystallinity.

The high melting points of the cross-linked polymers of the invention make them excellent construction materials, e.g., beams, pillars, gears for machinery, etc.

The process of this invention is economically profitable because the amidediol and the diamidediol can be made at low cost by known manufacturing processes, one of which is the reaction of $\epsilon$-caprolactone with diamines or monoalkanolamines and the basic starting material can be easily obtained.

Our invention is further illustrated by the following examples.

Example 1

In a 1 liter three-necked flask equipped with a condenser, a stirrer, a nitrogen inlet and outlet and a thermometer, 61.08 g. (1 mole) of ethanolamine and 114.1 g. (1 mole) of $\epsilon$-caprolactone were placed and reacted wtih stirring at 100° C. for 16 hours. Evaporation of the unreacted liquid under a reduced pressure gave a yellow solid. The yellow solid was recrystallized with acetonitrile, recrystallized again with methanol to give colorless crystals of N-(2-hydroxyethyl) 6-hydroxycaproamide.

Yield: 64.3%. Melting point: 73.5–74.1° C.

A 200 ml. three-necked flask equipped with a stirrer, a condenser, a dropping funnel and a nitrogen inlet and outlet, was heated with a burner flame to remove a trace of moisture in a nitrogen stream. In this flask were placed N-(2-hydroxyethyl) 6 - hydroxycaproamide and a mixed solvent of chlorobenzene with O-dichlorobenzene (8:2 volume ratio) for polymerization with stirring at temperatures in Table 1. After adding di-n-butyl-tin-dilaurate, about a half amount of the solution of hexamethylene diisocyanate dissolved in the above mixed solution was added from the dropping funnel and the remainder was gradually added dropwise during 10 to 45 minutes. After the adding was finished, stirring was further continued several more minutes. The resulting solution gave a polymer precipitate in cooling to the room temperature. After the solvent was distilled off by steam distillation, the resulting solid polymer was dissolved in N,N-dimethylformamide and reprecipitated with water to give a white polymer.

The detailed polymerization conditions and properties of the polymers are shown in Table 1.

TABLE 1

|  | Experimental number | | |
| --- | --- | --- | --- |
|  | 1-1 | 1-2 | 1-3 |
| Amidediol/solvent | 0.20 mole/70 ml | 0.01 mole/35 ml | 0.02 mole/70 ml. |
| Diisocyanate/solvent | 0.2 mole/ 30 ml | 0.011 mole/20 ml | 0.021 mole /30 ml. |
| Adding of diisocyanate | For 15 minutes [1] | For 45 minutes [1] | For 10 minutes. [1] |
| Polymerization temperature (° C.) | 140–145 | 150–155 | 155–160. |
| Yield (percent) | 83.7 | 77.8 | 75.4. |
| Melting point (° C.) | 139–148 | 140–148 | 140–148. |
| $\eta_{inh}$ | 0.41 | 0.73 | 0.78. |

[1] After a half was added, the remainder was dropped.

In the case of Table 1, 0.011 g. of di-n-butyl-tin-dilaurylate was added per 0.01 mole of N-(2-hydroxyethyl) 6-hydroxycaproamide. The total polymerization time was 1 hour. In Table 1, the defined melting point is the crystalline melting point observed through a pair of polaroids and $\eta_{inh}$ is the inherent-viscosity measured in m-cresol solution containing 0.5 g. of the polymer per 100 ml. m-cresol at 30° C. Measuring methods of melting points and inherent viscosities are the same in other tables as well.

As shown in Table 1, adding of a slightly excess equivalent amount of diisocyanate over that of amidediol gives polymers of higher degree of polymerization. When the polymerization scale is larger, less amount of excess diisocyanate is enough.

Among the polymers thus obtained as above, the polymers of the experimental numbers 1–2 and 1–3 gave transparent or translucent strong films both by melt and dry processes. These films were highly dyeable with the same dyes as used for nylons.

Example 2

In the same apparatus as in Example 1, the inside of which had been dried sufficiently, n-(2-hydroxyethyl) 6-hydroxycaproamide and the solvent were added and after replacing the atmosphere with nitrogen, stirring was continued at temperatures in Table 2. Di-n-butyl-tin-dilaurylate was added into the above mixture, and then 4,4'-diphenylmethane diisocyanate was added at a time with or without solvent for polymerization with stirring for 45 to 120 minutes.

After the polymerization was completed, in the case that the polymer precipitated, the solvent was removed by steam distillation and the like in the same manner as in Example 1 and the polymer was dissolved in N,N-dimethylformamide and reprecipitated with water. In the case that the polymer was as a solution, the polymer was appropriately diluted with the solvent and reprecipitated with water to give a precipitate of the polymer, which was dried in vacuo.

The detailed synthesizing conditions and properties of the polymer are shown in Table 2.

such solvent as used for the polymerization in a heterogeneous system seems to be found hard to give high polymer in the case of this example in which 4,4'-diphenylmethane-diisocyanate was used. The high polymer as obtained in experimental number 2–4 can form transparent film by both melt and dry processes and the resulting film shows high dyeability and good solvent and light resistances.

Example 3

In a liter three-necked flask equipped with a condenser, a stirrer, a nitrogen inlet and outlet and a thermometer, 30 g. (0.5 mole) of ethylenediamine and 114 g. (1 mole) of ε-caprolactone were placed and reacted with stirring at 100° C. for 30 minutes. The resulting product was recrystallized with acetonitrile to give white powder which was recrystallized with ethanol to give colorless crystal. Yield: 70.0%. Melting point: 156–157° C.

In the same apparatus as in Example 1, 2.884 g. (0.01 mole) of N,N' - di - (6 - hydroxycaproyl) ethylenediamine, 30 ml. of o-dichlorbenzene and 5 mg. of di-n-butyl-tin-di-laurylate were added. After sufficiently replacing the atmosphere with nitrogen, the mixture was kept at 179° C. with vigorous stirring, about a half amount of the solution of 1.682 g. (0.01 mole) or 1.85 g. (0.011 mole) hexamethylene diisocyanate dissolved in 15 ml. of o-dichlorbenzene was added from the dropping funnel and the remainder was gradually added dropwise during 45 minutes. After the dropping addition was ended, stirring was continued during further 45 minutes.

The resulting polymer precipitate was filtered, dissolved in 20 ml. of N,N-di-methylformamide and the resulting solution was poured into 200 ml. of water to give white powder of the polymer.

Properties of the polymers are shown in Table 3.

TABLE 3

| Experimental number | Amount of diisocyanate used (mole) | Yield (percent) | Melting point (° C.) | $\eta_{inh}$ |
|---|---|---|---|---|
| 3–1 | 0.010 | 60.1 | 208–212 | 0.34 |
| 3–2 | 0.011 | 81.0 | 210–213 | 0.74 |

TABLE 2

| Experimental number | Polymerization system | Amidediol/solvent | Diisocyanate/solvent | Catalyst | Polymerization Temperature (° C.) | Time (min.) | Yield (percent) | M.P. (° C.) | $\eta_{inh}$ |
|---|---|---|---|---|---|---|---|---|---|
| 2–1 | Homogeneous system. | 0.01 mole/20 ml. DMSO | 0.01 mole/without solvent | None | 26 | 120 | 74.6 | 150–167 | 0.14 |
| 2–2 | do | 0.01 mole/25 ml. DMF | do | do | 155–170 | 90 | 76.6 | 153–162 | 0.14 |
| 2–3 | do | 0.01 mole/20 ml. DMF | 0.013 mole/without solvent | Added | 115–135 | 45 | 98.5 | 148–157 | 0.35 |
| 2–4 | do | do | do | do | 120–125 | 75 | 98.1 | 153–168 | 0.78 |
| 2–5 | do | 0.01 mole/30 ml. NB | do | None | 160–164 | 120 | 98.4 | 167–179 | 0.44 |
| 2–6 | Heterogeneous system. | 0.01 mole/25 ml. DCB | 0.01 mole/15 ml. DCB | do | 180–200 | 90 | 55.1 | 146–164 | 0.27 |
| 2–7 | do | 0.01 mole/45 ml. mixed solvent | 0.01 mole/without solvent | Added | 140–155 | 90 | 76.6 | 144–160 | 0.24 |
| 2–8 | do | 0.02 mole/50 ml. mixed solvent | 0.021 mole/without solvent | do | 150–160 | 90 | 72.4 | 147–163 | 0.27 |
| 2–9 | do | 0.01 mole/40 ml. mixed solvent | 0.012 mole/without solvent | do | 155–165 | 45 | 86.5 | 145–161 | 0.36 |
| 2–10 | do | do | 0.013 mole/without solvent | None | 175–185 | 120 | 47.6 | 146–162 | 0.21 |

In Table 2, DMSO indicates dimethylsulfoxide, DMF indicates N,N-dimethylformamide, NB indicates nitrobenzene, DCB indicates o-dichlorbenzene, and mixed-solvent indicates the mixture of o-dichlorbenzene and chlorbenzene in the ratio of 2 to 8, respectively. As a catalyst, 0.011 g. of di-n-butyl-tin-dilaurylate was added to 0.01 mole of amidediol.

As shown in Table 2, high polymer was not obtained from the reaction of amidediol with diisocyanate in the mole ratio of 1 to 1. An excess amount of diisocyanate is desirable to be used. It is obvious from the comparison with results between experimental number 2–3 and 2–4 that the polymerization is desired to be continued for more than 1 hour up to about 2 hours, because a shorter polymerization time hardly gives high polymer.

On the contrary to the case of Example 1, the use of

It is obvious from the comparison with results between experimental number 3–1 and 3–2 that the use of an excess amount of diisocyanate is necessary to produce a polymer of high degree of polymerization. The film produced from this polymer is strong and shows a high melting point in spite of an aliphatic polymer. The dyeability of this film is excellent.

Example 4

In the same apparatus as in Example 1, 2.884 g. (0.01 mole) of N,N-di-(6-hydroxycaproyl) ethylenediamine and 20 m. of N,N-diethylformamide were placed and stirred to be dissolved under a nitrogen atmosphere. Being kept at a definite temperature with stirring, the mixture was added with 2.502 g. (0.01 mole) or 3.253 g. (0.013 mole) of 4,4'-diphenylethane-diisocyanate by itself or as a solution from the dropping funnel. After the polymerization was carried out for 1 hour, the reaction solution was added into 400 ml. of methanol for reprecipitation and white powder was obtained by filtration and drying in vacuo.

The results are shown in Table 4.

TABLE 4

|  | Experimental number | | |
|---|---|---|---|
|  | 4-1 | 4-2 | 4-3 |
| Diisocyanate/solvent | (1) | (2) | (3) |
| Catalyst | None | Added | Added |
| Polymerization temperature (° C.) | 120-150 | 160-170 | 120-150 |
| Yield (percent) | 86.2 | 93.5 | 90.3 |
| Melting point (° C.) | 237-245 | 233-239 | 239-245 |
| $\eta_{inh}$ | 0.40 | 0.33 | 0.94 |

1 0.01 mole/without solvent.
2 0.01 mole/10 ml. DMF.
3 0.013 mole/without solvent.

After adding 0.011 g. of di-n-butyl-tin-di-laurylate to the above mixture, a solution of hexamethyleneisocyanate was added to be polymerized during a definite time. After the polymerization was completed, the solvent was removed by steam distillation and the resulting polymer was dissolved in 50 ml. of N,N-dimethylformamide. This solution was added into 500 ml. of water to give a precipitate of the polymer.

In Table 5, the polymerization conditions and the results are shown.

As shown in Table 5, the degrees of polymerization of the resulting polymers varies according to the kind of solvents. In this case, o-dichlorbenzene (DCB) gives better results than the mixed-solvent (chlorbenzene:o-dichlorbenzene=8:2). Transparent or translucent strong films can be formed from the thus obtained high polymer (experimental number 5-4) by both melt and dry processes, which show high dyeability and high crystallinity.

TABLE 5

|  | Experimental number | | | |
|---|---|---|---|---|
|  | 5-1 | 5-2 | 5-3 | 5-4 |
| Diamidediol/solvent | 0.01 mole/70 ml. mixed solvent. | 0.01 mole/35 ml. mixed solvent. | 0.01 mole/40 ml. DCB | 0.01 mole/40 ml. DCB. |
| Diisocyanate/solvent | 0.012 mole/30 ml. mixed solvent. | 0.0115 mole/20 ml. mixed solvent. | 0.0115 mole/20 ml. DCB | 0.011 mole/20 ml. DCB. |
| Addition of diisocyanate | Added at a time | After adding a half, the remainder was dropped for 45 min. | After adding a half, the remainder was dropped for 45 min. | After adding a half, the remainder was dropped for 30 min. |
| Polymerization time (minutes) | 60 | 90 | 90 | 45. |
| Polymerization temperature (° C.) | 140-150 | 155-165 | 180-190 | 185-195. |
| Yield (percent) | 90.0 | 83.8 | 90.5 | 92.3. |
| Melting point (° C.) | 186-194 | 178-190 | 181-189 | 182-190. |
| $\eta_{inh}$ | 0.33 | 0.31 | 0.49 | 0.71. |

In this case also, the use of an excess amount of diisocyanate is preferable for producing high polymer. The film produced from the polymer thus obtained shows high dyeability and high melting point.

Example 5

In a 1 liter three-necked flask equipped with a condenser, a nitrogen inlet and outlet, a stirrer and a thermometer, 58.0 g. (0.5 mole) of hexamethylenediamine and 171 g. (1.5 moles) of ε-caprolactone were placed and reacted at 100° C. for 18 hours with stirring.

Unreacted ε-caprolactone was removed by evaporation in vacuo to give solid, which was crystallized with acetonitrile, followed by recrystallization again with water, and N,N' - di-(6-hydroxycaproyl) hexamethylenediamine was obtained.

Yield: 62.5%. Melting point: 135 to 136° C.

In the same apparatus as in Example 1, 3.445 g. (0.01 mole) of N,N' - di - (6 - hydroxycaproyl)hexamethylenediamine and solvent were placed and after replacing the atmosphere with nitrogen, stirring was continued at a definite temperature.

Example 6

In the same apparatus as in Example 1, 3.445 g. (0.01 mole) of N,N'-di-(6-hydroxycaproyl)hexamethylenediamine and solvent were placed and after replacing the atmosphere with nitrogen, the mixture was stirred at a definite temperature followed by adding of 0.011 g. of di-n-butyl-tin-di-laurylate and then by adding 4,4-di-phenylmethane diisocyanate by itself or as a solution at a time.

After the polymerization was carried out for a definite time, in the case that the resulting polymer was as a solution (in the case of N,N-dimethylformamide or dimethylsulfoxide), the solution was poured into water to give a precipitate of the polymer, and in the case that the polymer precipitated (in the case of o-dichlorbenzene), after the solvent was removed by decantation, the polymer was dissolved in N,N-dimethylformamide and the solution was poured into water to give a precipitate of the polymer.

In Table 6, the synthetic conditions and results are shown.

TABLE 6

|  | Experimental Number | | | |
|---|---|---|---|---|
|  | 6-1 | 6-2 | 6-3 | 6-4 |
| Diamidediol/solvent | 0.01 mole/10 ml. DMF | 0.01 mole/25 ml. DMF | 0.01 mole/50 ml. DMSO | 0.01 mole/50 ml. DCB |
| Diisocyanate/solvent | 0.01 mole/10 ml. DMF | 0.013 mole/without solvent | 0.015 mole/without solvent | 0.013 mole/without solvent. |
| Catalyst | Added | Added | None | Added. |
| Polymerization temperature (° C.) | 140 | 115-135 | 22 | 185-200. |
| Polymerization time (minutes) | 90 | 30 | 120 | 60. |
| Yield (percent) | 84.0 | 98.3 | 84.7 | 95.1. |
| Melting point (° C.) | 213-227 | 196.5-215 | 213-255 | 218-230. |
| $\eta_{inh}$ | 0.29 | 1.13 | 0.46 | 0.32. |

As shown in Table 6, the use of an excess amount of diisocyanate is preferable for producing high polymer.

Generally speaking, in the case that 4,4-diphenylmethane diisocyanate is used as a diisocyanate, high polymer is hardly obtained with heterogeneous solvent (o-dichlorbenzene etc.).

A transparent strong film can be formed from thus obtained high polymer (experimental number 6–2), which shows high dyeability and excellent light and solvent resistances.

Example 7

In the same apparatus as in Example 1, 6.890 g. (0.02 mole) of N,N-di-(6-hydroxycaproyl)hexamethylenediamine and 20 ml. of N,N-dimethylformamide were placed and after replacing the atmosphere with nitrogen, the mixture was stirred at 80° C. To this mixture, the solution made by dissolving 3.828 g. (0.022 mole) of toluylene diisocyanate (mixture of 2,4-tolylene diisocyanate:2,6-toluylene diisocyanate=8:2) into 20 ml. of N,N-dimethylformamide, was added and then polymerization was carried out during 50 minutes. The resulting solution was added into 400 ml. of chloroform to give a precipitate of the polymer.

Yield: 65.0%. Melting point: 253 to 262° C.

$\eta_{inh}$: 0.67. A strong film with a high dyeability was formed from this high polymer.

Example 8

In the same apparatus as in Example 1, totally 0.01 mole of a mixture of N-hydroxyalkyl-6-hydroxycaproamide, N,N'-di-(6-hydroxycaproyl) ethylenediamine, N,N'-di-(6'-hydroxycaproyl)hexamethylenediamine, 1,3-propanediol, 1,4-butanediol and 1,6-hexanediol were placed and followed by adding of the solvent in a nitrogen atmosphere for polymerization with stirring at temperatures in Tables 7 and 8. To this mixture, 0.01 g. of di-n-butyl-tin-di-laurylate was added and then hexamethylene diisocyanate or 4,4'-diphenylmethane diisocyanate was added with or without solvent. After the mixture was stirred during a definite time, in the case that the polymer was as a homogeneous solution, the polymer was precipitated with water and in the case that the polymer was as a precipitate, the solvent was removed by filtration or steam distillation, and the resutling solid was dissolved in N,N-dimethylformamide. The resulting solution was poured into water to give a precipitate of the polymer.

In Tables 7 and 8, the synthetic conditions and the properties of the polymers are shown.

TABLE 7

| Experimental number | Diol/solvent | Diisocyanate/solvent |
|---|---|---|
| 8-1 | ECA:CED=2:1/35 ml mixed solvent | 0.011 mole HMDI/20 ml. mixed solvent. |
| 8-2 | CED:CHD=1:2/40 ml. DCB | 0.011 mole HMDI/20 ml. DCB. |
| 8-3 | ECA:CHD=1:2/25 ml. DMF | 0.013 mole MDI/without solvent. |
| 8-4 | ECA:1,3-PD=1:9/35 ml. mixed solvent | 0.0105 mole HMDI/30 ml. mixed solvent. |
| 8-5 | CHD:1,4-BD=8:1/40 ml. DCB | 0.011 mole HMDI/20 ml. DCB. |
| 8-6 | CHD:1,6-HD=9:1/30 ml. DMF | 0.012 mole MDI/without solvent. |

TABLE 8

| Experimental number | Addition of diisocyanate | Polymerization Temperature (° C.) | Time (min.) | Yield (percent) | M.P. (° C.) | $\eta_{inh}$ |
|---|---|---|---|---|---|---|
| 8-1 | After adding a half, the remainder was dropped for 30 minutes | 155-160 | 60 | 80.0 | 175-181 | 0.69 |
| 8-2 | do | 185-195 | 50 | 87.3 | 175-185 | 0.63 |
| 8-3 | Added at a time | 120-135 | 45 | 93.5 | 178-189 | 0.84 |
| 8-4 | After adding a half, the remainder was dropped for 10 minutes | 155-160 | 60 | 80.2 | 145-153 | 0.91 |
| 8-5 | After adding a half, the remainder was dropped for 20 minutes | 185-190 | 45 | 92.8 | 164-173 | 0.71 |
| 8-6 | Added at a time | 125-135 | 35 | 98.2 | 196-210 | 0.85 |

In Table 7, ECA indicates N-hydroxyalkyl-6-hydroxycaproamide, CED indicates N,N'-di-(6-hydroxycaproyl) ethylenediamine, CHD indicates N,N'-di-(6-hydroxycaproyl)hexamethylenediamine, mixed-solvent indicates the mixture of o-dichlorbenzene and chlorbenzene in the ratio of 2 to 8, HMDI indicates hexamethylene-diisocyanate, MDI indicates 4,4'-diphenylmethanediisocyanate, DCB indicates dichlorbenzene and DMF indicates N,N-dimethylformamide.

Thus obtained polymer shows high polymerization degree and films can be formed from the polymer by both melt and dry processes. These films show high dyeability.

Example 9

For Run 9–1 into a three-necked flask equipped with a reflux condenser, a stirrer and a dropping funnel were placed 108 g. of p-phenylenediamine. The inside of the flask was thoroughly flushed with nitrogen, and 228 g. of ε-caprolactone in the dropping funnel was dropwise added into the p-phenylenediamine agitated at 160° C. during the course of one hour. The mixture was stirred at 160° C. 17 more hours. The resulting solid was recrystallized in 30 liters of water to give light-purple crystals of N,N'-di-(6-hydroxycaproyl)p-phenylenediamine.

Yield 22.0%. Melting point 195–196.5° C.

Into a 200 ml. flask of the type described above, were placed 16.82 g. (0.050 mole) of N,N'-di-(6-hydroxycaproyl) p-phenylenediamine, and 75 ml. of N,N-dimethylformamide. The mixture was stirred in a nitrogen atmosphere to give a homogeneous solution. Into the stirred solution 0.055 g. of di-n-butyl-tin-dilaurylate were added followed by the addition of 10.93 g. (0.065 mole) of hexamethylene diisocyanate dissolved in 50 ml. of N,N-dimethylformamide. The mixture was stirred at 155±2° C. for 90 min.

The resulting product was precipitated in one liter of methanol in a high speed mixer to give a colorless powder, which was washed with methanol and dried in a vacuum.

The results of this run as well as those of the other runs are tabulated in Table 9. (The only differences are those indicated.)

TABLE 9

| Exp. No. | CPPD mole/ solvent (ml.) | Diisocyanate mole/ solvent (ml.) | Polymerization Time (min.) | Temperature (° C.) | Yield (percent) | Density (g./cm.³) | Melting point (° C.) | Inherent viscosity |
|---|---|---|---|---|---|---|---|---|
| 9-1 | 0.05/75 DMF | 0.065HMDI/50 DMF | 90 | 155±2 | 87.1 | 1.201 | 224-227 | 0.303 |
| 9-2 | 0.05/75 DMF | 0.065HMDI/50 DMF | 180 | 155±2 | 90.1 | 1.204 | 236-240 | 0.347 |
| 9-3 | 0.05/75 DMF | 0.065 MDI/none | 60 | 125±2 | 99.7 | 1.221 | 245-258 | 0.482 |
| 9-4 | 0.01/25 DMF | 0.015 MDI/none | 60 | 125±2 | 99.5 | 1.227 | 210-225 | 0.411 |
| 9-5 | 0.02/20 DMF | 0.024 TDI/20 DMF | 60 | 155±2 | 94.5 | 1.260 | 172-175 | 0.157 |
| 9-6 | 0.02/20 DMF | 0.024 TDI/20 DMF | 60 | 155±2 | 98.5 | 1.256 | 152-154 | 0.212 |
| 9-7 | 0.01/20 DMF | 0.013 TDI/20 DMF | 60 | 155±2 | 92.5 | 1.259 | 149-157 | 0.277 |

Note.—Di-butyl-tin-dilaurylate (0.055 g./0.05 mole of amidediol) was used as catalyst. CPPD=N,N'-di-(6-hydroxycaproyl) p-phenylenediamine; DMF=N,N-dimethylformamide; HMDI=Hexamethylene diisocyanate; MDI=Diphenylmethane diisocyanate; TDI=Toluylene diisocyanate.

Example 10

Into the same apparatus as in Example 9 were placed 77.5 g. (0.8 mole) of piperazine, which were melted and stirred at 120° C. in a nitrogen atmosphere. Into this piperazine was added dropwise 205.2 g. (1.8 mole) of ε-caprolactone for 30 min., and the resultant mixture was stirred at 120° C. for 20 hours. The resulting product was left in the room temperature until a solid product came out, which was recrystallized in aqueous ammonia.

Yield 25.0%. Melting point 78-79° C.

0.02 mole of N,N'-di-(6-hydroxycaproyl) piperazine obtained as above was polymerized with the isocyanates as listed in Table 10 by the similar method as in Example 9 to give polyamideurethanes as tabulated in Table 10.

TABLE 10

| Exp. No. | CPZ mole/ solvent (ml.) | Diisocyanate mole/ solvent (ml.) | Polymerization Time (min.) | Tempera- ture (° C.) | Yield (percent) | Density (g./cm.³) | Melting point (° C.) | Inherent viscosity |
|---|---|---|---|---|---|---|---|---|
| 10-1 | 0.02/30 DMF | 0.026 HMDI/20 DMF | 60 | 155±2 | 50.6 | 1.235 | 145-147 | 0.413 |
| 10-2 | 0.02/30 DMF | 0.026 MDI/none | 60 | 125±2 | 99.0 | 1.204 | 155-157 | 0.416 |
| 10-3 | 0.02/30 DMF | 0.026 TDI/20 DMF | 60 | 155±2 | 39.0 | 1.263 | >300 | 0.291 |

Note.—Di-n-butyl-tin-dilaurylate (0.055 g./0.05 mole of amidediol) was used as catalyst. CPZ=N,N'-di-(6-hydroxycaproyl) piperazine. Other abbreviations are same as in Table 9.

While several embodiments of the invention have been shown and described, other variations will be readily apparent to those skilled in the art. Therefore, the invention is not limited to these embodiments but is intended to cover all such variations as may be within the scope of the invention defined by the following claims.

We claim:

1. A polymer comprising a plurality of repeating units of the formula:

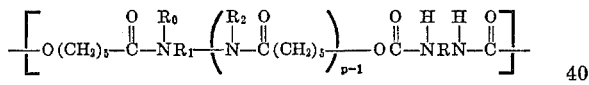

wherein:
(a) $p$ is an integer having a value of 1 or 2;
(b) R is a bivalent saturated aliphatic radical having from 2–20 carbon atoms, a bivalent aromatic radical having from 6–18 carbon atoms or a bivalent radical of at least one saturated aliphatic radical and at least one aromatic radical, the total aliphatic and aromatic portions of the bivalent radical R having from 1–20 and from 6–18 carbon atoms, respectively;
(c) when $p$ is 1,
  (i) $R_0$ is hydrogen, a monovalent saturated aliphatic radical, a monovalent aromatic radical or a monovalent radical of at least one saturated aliphatic radical and at least one aromatic radical, the total aliphatic and aromatic portions of $R_0$ having from 1–20 and from 6–18 carbon atoms, respectively, and $R_1$ is a bivalent saturated aliphatic radical or a bivalent radical of at least one saturated aliphatic radical connected to the adjacent oxygen radical and at least one aromatic radical, the total aliphatic and aromatic portions of $R_1$ having from 1–20 and from 6–18 carbon atoms, respectively, or,
  (ii) optionally, $R_0$ and $R_1$ together form $R_3$ which taken with the intermediate nitrogen radical forms a heterocycloalkane radical, $R_3$ being a trivalent saturated aliphatic radical or a trivalent radical of at least one saturated aliphatic radical and at least one aromatic radical, the total aliphatic and aromatic portions of $R_3$ having from 4 to 20 and 6–18 carbon atoms, respectively,
(d) when $p$ is 2,
  (i) $R_0$ and $R_2$ are hydrogen, monovalent saturated aliphatic radicals, monovalent aromatic radicals or monovalent radicals of at least one saturated aliphatic radical and at least one aromatic radical, the total aliphatic and aromatic portions of $R_0$ and $R_2$ having from 1–20 and from 6–18 carbon atoms, respectively, and $R_1$ is a bivalent saturated aliphatic radical having from 2–20 carbon atoms, a bivalent aromatic radical having from 6–18 carbon atoms, or a bivalent radical of at least one saturated aliphatic radical and at least one aromatic radical, the total aliphatic and aromatic portions of bivalent radical $R_1$ having from 1–20 and from 6–18 carbon atoms, respectively, or
  (ii) optionally, $R_0$ and $R_1$ together form $R_3$ which taken with the intermediate nitrogen radical forms a heterocycloalkane ring structure, $R_3$ being a trivalent saturated aliphatic radical or a trivalent radical of at least one saturated aliphatic radical and at least one aromatic radical, the total aliphatic and aromatic portions of $R_3$ having from 4 to 20 and 6–18 carbon atoms, respectively, and $R_2$ is hydrogen, a monovalent saturated aliphatic radical, a monovalent aromatic radical or a monovalent radical of at least one saturated aliphatic radical and at least one aromatic radical, the total aliphatic and aromatic portions of $R_2$ having from 1–20 and from 6–18 carbon atoms, respectively, or,
  (iii) optionally, $R_0$ and $R_2$ together form $R_4$, $R_1$ and $R_4$ being bivalent saturated aliphatic radicals or bivalent radicals of at least one saturated aliphatic radical and at least one aromatic radical which form with adjacent nitrogen radicals a heterocycloalkane ring structure, the aliphatic and aromatic portions of $R_1$ and $R_4$ each having from 1–20 and from 6–18 carbon atoms, respectively, and
(e) $n$ is a value such that the inherent viscosity is at least 0.1 when measured in m-cresol at 30° C. at a concentration of 0.5 g. per 100 ml. of m-cresol and increases to infinity in the case of cross-linked polymers.

2. A polymer according to claim 1 wherein
(a) $p$ is an integer having a value of 1 or 2;
(b) R is an alkylene radical having from 2–20 carbon atoms, a cycloalkylene, an arylene or an aralkylene, the total aliphatic and aromatic portions of R having from 1–20 and from 6–18 carbon atoms, respectively;
(c) when $p$ is 1,
  (i) $R_0$ is hydrogen, an alkyl radical, a cycloalkyl radical, an aryl radical or an aralkyl radical, the total aliphatic and aromatic portions of $R_0$ having from 1–20 and from 6–18 carbon atoms, respectively, and $R_1$ is an alkylene radical, a cycloalkylene radical, or an aralkylene radical having the aliphatic portion connected to the adjacent oxygen radical, the total aliphatic and aromatic portions of $R_1$ having from 1–20 and from 6–18 carbon atoms, respectively, or,
  (ii) optionally, $R_0$ and $R_1$ together form $R_3$ which taken with the intermediate nitrogen radical forms a 5 or 6 membered heterocycloalkane radical, $R_3$ being a trivalent radical of alkane, cycloalkylalkane, or aryalkane, the total aliphatic and aromatic portions of $R_3$ having from 4–20 and 6–18 carbon atoms, respectively,

19

(d) when p is 2,
 (i) $R_0$ and $R_2$ are hydrogen, alkyl radicals, cycloalkyl radicals, aryl radicals or aralkyl radicals, the total aliphatic and aromatic portions of $R_0$ and $R_2$ having from 1–20 and from 6–18 carbon atoms, respectively, and $R_1$ is an alkylene radical having from 2–20 carbon atoms, cycloalkylene radical, an arylene radical or an aralkylene radical, the total aliphatic and aromatic portions of $R_1$ having from 1–20 and from 6–18 carbon atoms, respectively,
 (ii) optionally, $R_0$ and $R_1$ together form $R_3$ which taken with the intermediate nitrogen radical forms a 5 or 6 membered heterocycloalkane ring structure, $R_3$ being a trivalent radical of alkane, cycloalkylalkane or aralkane, the total aliphatic and aromatic portions of $R_3$ having from 4 to 20 and 6–18 carbon atoms, respectively, and $R_2$ is hydrogen, an alkyl radical, a cycloalkyl radical, an aryl radical or an aralkyl radical, the total aliphatic and aromatic portions of $R_2$ having from 1–20 and from 6–18 carbon atoms, respectively, or,
 (iii) optionally, $R_0$ and $R_2$ together form $R_4$, $R_1$ and $R_4$ being alkylene radicals, cycloalkylalkylene radicals or aralkylene radicals which form with adjacent nitrogen radicals a 5 or 6 membered ring structure, the aliphatic and aromatic portions of $R_1$ and $R_4$ each having from 1–20 and from 6–18 carbon atoms, respectively, and
(e) $n$ is a value such that the inherent viscosity is at least 0.1 when measured in m-cresol at 30° C. at a concentration of 0.5 g. per 100 ml. of m-cresol and increases to infinity in the case of cross-linked polymers.

3. A polymer according to claim 2 wherein, when $p$ is 1, $R_0$ is hydrogen or a lower alkyl radical and $R_1$ is an alkylene radical, a cycloalkylene radical, or an arakylene radical having the aliphatic portion connected to the adjacent oxygen radical, the total aliphatic and aromatic portions of $R_1$ having from 1–20 and from 6–18 carbon atoms, respectively.

4. A polymer of claim 3 wherein $R_0$ and $R_2$ are hydrogen, $R_1$ is ethylene and R is hexamethylene.

5. A polymer of claim 3 wherein $R_0$ and $R_2$ are hydrogen, $R_1$ is ethylene and R is diphenylmethane.

6. A polymer according to claim 2 wherein, when $p$ is 2, $R_0$ and $R_2$ are hydrogen or lower alkyl radical and $R_1$ is an alkylene radical, a cycloalkylene radical, or an aralkylene radical having the aliphatic portion connected to the adjacent oxygen radical, the total aliphatic and aromatic portions of $R_1$ having from 1–20 and from 6–18 carbon atoms, respectively.

7. A polymer of claim 6 wherein $R_0$ and $R_2$ are hydrogen, $R_1$ is ethylene and R is hexamethylene.

8. A polymer of claim 6, wherein $R_0$ and $R_2$ are hydrogen, $R_1$ is ethylene and R is diphenylmethane.

9. A polymer of claim 6 wherein $R_0$ and $R_2$ are hydrogen, $R_1$ is hexamethylene and R is hexamethylene.

10. A polymer of claim 6 wherein $R_0$ and $R_2$ are hydrogen, $R_1$ is hexamethylene and R is toluylene.

11. A polymer according to claim 2 wherein, when $p$ is 2, $R_0$ and $R_2$ together form $R_4$, $R_1$ and $R_4$ being alkylene radicals, cycloalkyalkylene radicals or aralkylene radicals which form with adjacent nitrogen radicals a 5 or 6 membered ring structure, the aliphatic and aromatic portions of $R_1$ and $R_4$ each having from 1–20 and from 6–18 carbon atoms, respectively.

12. A polymer of claim 11 wherein $R_0$, $R_1$ and $R_2$ taken with adjacent nitrogen radicals form piperazine.

13. A polymer of claim 12 wherein R is hexamethylene, diphenylmethane or toluylene.

14. A polymer of claim 1 wherein said inherent viscosity has a value of 0.4–5.

15. A polymer of claim 1 wherein said inherent viscosity is infinite and said polymer is highly cross-linked.

20

16. A method of making a polymer having a plurality of repeating units of the formula:

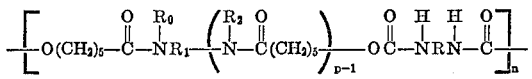

wherein:
(a) $p$ is an integer having a value of 1 or 2;
(b) R is a bivalent saturated aliphatic radical having from 2–20 carbon atoms, a bivalent aromatic radical having from 6–18 carbon atoms or a bivalent radical of at least one saturated aliphatic radical and at least one aromatic radical, the total aliphatic and aromatic portions of the bivalent radical R having from 1–20 and from 6–18 carbon atoms, respectively;
(c) when $p$ is 1,
 (i) $R_0$ is hydrogen, a monovalent saturated aliphatic radical, a monavalent aromatic radical or a monovalent radical of at least one saturated aliphatic radical and at least one aromatic radical, the total aliphatic and aromatic portions of $R_0$ having from 1–20 and from 6–18 carbon atoms, respectively, and $R_1$ is a bivalent saturated aliphatic radical or a bivalent radical of at least one saturated aliphatic radical connected to the adjacent oxygen radical and at least one aromatic radical, the total aliphatic and aromatic portions of $R_1$ having from 1–20 and from 6–18 carbon atoms, respectively, or,
 (ii) optionally, $R_0$ and $R_1$ together form $R_3$ which taken with the intermediate nitrogen radical forms a heterocycloalkane radical, $R_3$ being a trivalent saturated aliphatic radical or a trivalent radical of at least one saturated aliphatic radical and at least one aromatic radical, the total aliphatic and aromatic portions of $R_3$ having from 4 to 20 and 6–18 carbon atoms, respectively,
(d) when $p$ is 2,
 (i) $R_0$ and $R_2$ are hydrogen, monovalent saturated aliphatic radicals, monovalent aromatic radicals or monovalent radicals of at least one saturated aliphatic radical and at least one aromatic radical, the total aliphatic and aromatic portions of $R_0$ and $R_2$ having from 1–20 and from 6–18 carbon atoms, respectively, and $R_1$ is a bivalent saturated aliphatic radical having from 2–20 carbon atoms, a bivalent aromatic radical having from 6–18 carbon atoms, or a bivalent radical of at least one saturated aliphatic radical and at least one aromatic radical, the total aliphatic and aromatic portions of bivalent radical $R_1$ having from 1–20 and from 6–18 carbon atoms, respectively, or
 (ii) optionally, $R_0$ and $R_1$ together form $R_3$ which taken with the intermediate nitrogen radical forms a heterocycloalkane ring structure, $R_3$ being a trivalent saturated aliphatic radical or a trivalent radical of at least one saturated aliphatic radical and at least one aromatic radical, the total aliphatic and aromatic portions of $R_3$ having from 4 to 20 and 6–18 carbon atoms, respectively, and $R_2$ is hydrogen, a monovalent saturated aliphatic radical, a monovalent aromatic radical or a monovalent radical of at least one saturated aliphatic radical and at least one aromatic radical, the total aliphatic and aromatic portions of $R_2$ having from 1–20 and from 6–18 carbon atoms, respectively, or,
 (iii) optionally, $R_0$ and $R_2$ together form $R_4$, $R_1$ and $R_4$ being bivalent saturated aliphatic radicals or bivalent radicals of at least one saturated aliphatic radical and at least one aromatic radical which form with adjacent nitrogen radicals an alkane ring structure, the aliphatic and aromatic portions of $R_1$ and $R_4$ each having from 1–20 and from 6–18 carbon atoms, respectively, and
(e) $n$ is a value such that the inherent viscosity is at least 0.1 when measured in m-cresol at 30° C. at a concentration of 0.5 g. per 100 ml. of m-cresol and increases to infinity in the case of cross-linked polymers, said method comprising:

(1) forming a diol-diisocyanate admixture of compounds comprising a diol of the formula:

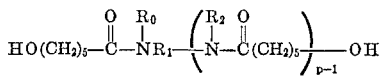

a diisocyanate of the formula $$O=C-N-R-N=C=O$$

wherein $R_0$, $R_1$, $R_2$, R, and $p$ are as defined above, at least a stoichiometric quantity of diisocyanate being present in the admixture based on the diol content thereof;

(2) allowing said admixture to react under substantially anhydrous conditions at a temperature of 50–250° C.; and (3) recovering the polymeric product from the reaction mixture.

17. A method according to claim 16 wherein the diol portion of the admixture includes up to 90% by weight of an alkylene diol, a cycloalkylene diol or an aralkylene diol in which the aliphatic portion has from 2–20 carbon atoms.

18. A method according to claim 16 wherein the diol of the formula is N-6-hydroxycaproyl aminoalcohol.

19. A method according to claim 16 wherein the diol of the formula is N,N'-di-(6-hydroxycaproyl)-diamine.

20. A method according to claim 16 wherein the diol of the formula is an admixture of N-6-hydroxycaproyl aminoalcohol and N,N'-di-(6-hydroxycaproyl)-diamine.

21. A method according to claim 16 wherein the reaction is conducted in the presence of an inert organic solvent.

22. A method according to claim 21 wherein the solvent is a member selected from the group consisting of amides, ketones, cyclic thioethers and chlorobenzenes.

23. A method according to claim 16 wherein the diisocyanate is added portionwise to the diol.

24. A method according to claim 23 wherein the diisocyanate is present in an amount of up to a 30% molar excess, based on the stoichiometric amount of diol.

25. A method according to claim 24 wherein the diisocyanate is present in an amount up to a 10% molar excess based on the stoichiometric amount of diol.

26. A method according to claim 16 wherein the reaction is conducted in the presence of a catalytic amount of a catalyst selected from the group consisting of organo tin compounds and tertiary amines.

27. A method according to claim 16 wherein the reaction temperature is 100–200° C.

28. A polyamideurethane prepared by reacting N,N'-di-(6-hydroxycaproyl) diamine or N-6-hydroxycaproyl aminoalcohol with an organic diisocyanate wherein (a) N,N'-di-(6-hydroxycaproyl) diamine is an alkylene, a cycloalkylene, an arylene, an aralkylene, or a heterocyclic diamine, each of the two amino groups of said diamine being either primary or secondary;

(b) said organic diisocyanate is an alkylene, a cycloalkylene, an arylene or an aralkylene diisocyanate;

(c) N-6-hydroxycaproyl aminoalcohol is an alkylene, cycloalkylene, aralkylene or a heterocyclic monoamino monoalcohol; and (d) the degree of polymerization of said polyamide-urethane is such that the inherent viscosity is at least 0.1 when measured in m-cresol at 30° C. at a concentration of 0.5 g. per 100 ml. of m-cresol and increases to infinity in the case of cross-linked polymers.

29. A polymer having a plurality of repeating units of the formula:

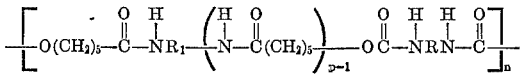

wherein:

(a) $R_1$ is an alkylene radical having from 2–20 carbon atoms;

(b) R is a member selected from the group consisting of alkylene radicals having from 2–20 carbon atoms, diphenylalkylene radicals and lower alkyl substituted diphenylalkylene radicals, the alkyl and alkylene portions of which have from 1–20 carbon atoms and arylene radicals having from 6–18 carbon atoms;

(c) $p$ is an integer having a value of 1–2; and (d) $n$ is a value such that the inherent viscosity is at least 0.4 when measured in m-cresol at 30° C. at a concentration of 0.5 g./100 ml. m-cresol.

References Cited
FOREIGN PATENTS
1,069,558   5/1967   Great Britain ____ 260—77.5 AQ MAURICE J. WELSH, Primary Examiner U.S. Cl. X.R.
260—2.5 AQ